(12) United States Patent
Kejha

(10) Patent No.: US 10,577,044 B1
(45) Date of Patent: Mar. 3, 2020

(54) SAFE THREE-WHEELED TILTING VEHICLES' FRAME AND STEERING WITH TWO FRONT WHEELS

(71) Applicant: Joseph B. Kejha, Meadowbrook, PA (US)

(72) Inventor: Joseph B. Kejha, Meadowbrook, PA (US)

(73) Assignee: H2 HYBRID SCOTTERS LLC, Meadowbrook, PA (US)

( * ) Notice: Subject to any disclaimer, the term of this patent is extended or adjusted under 35 U.S.C. 154(b) by 0 days.

(21) Appl. No.: 16/501,516

(22) Filed: Apr. 22, 2019

(51) Int. Cl.
| | |
|---|---|
| *B62K 5/08* | (2006.01) |
| *B62M 7/12* | (2006.01) |
| *B60K 7/00* | (2006.01) |
| *B60K 5/00* | (2006.01) |
| *B62K 5/027* | (2013.01) |
| *B62K 23/02* | (2006.01) |
| *B62K 11/14* | (2006.01) |
| *B62J 1/08* | (2006.01) |
| *B60N 2/24* | (2006.01) |
| *B62J 17/04* | (2006.01) |
| *B60J 1/02* | (2006.01) |
| *B60K 6/24* | (2007.10) |
| *B60K 6/26* | (2007.10) |
| *B60K 6/28* | (2007.10) |
| *B60K 1/04* | (2019.01) |
| *B60K 6/387* | (2007.10) |
| *B62K 5/10* | (2013.01) |

(Continued)

(52) U.S. Cl.
CPC .................... *B62K 5/08* (2013.01);
*B60J 1/02* (2013.01); *B60K 1/04* (2013.01);
*B60K 5/00* (2013.01); *B60K 6/24* (2013.01);
*B60K 6/26* (2013.01); *B60K 6/28* (2013.01);
*B60K 6/387* (2013.01); *B60K 7/00* (2013.01);
*B60K 7/0007* (2013.01); *B60N 2/24* (2013.01);
*B62J 1/08* (2013.01); *B62J 17/04* (2013.01);
*B62K 5/027* (2013.01); *B62K 5/10* (2013.01);
*B62K 11/10* (2013.01); *B62K 11/14* (2013.01);
*B62K 23/02* (2013.01); *B62M 7/12* (2013.01);
*B60K 2001/0438* (2013.01); *B60K 2007/0092* (2013.01); *B60Y 2200/126* (2013.01); *B60Y 2200/92* (2013.01); *B60Y 2300/1815* (2013.01); *B60Y 2300/421* (2013.01); *B62H 1/02* (2013.01); *B62K 2201/00* (2013.01); *B62K 2208/00* (2013.01)

(58) Field of Classification Search
CPC .......... B62K 5/08; A63C 17/012; A63C 17/14
See application file for complete search history.

(56) References Cited

U.S. PATENT DOCUMENTS

| | | | | | |
|---|---|---|---|---|---|
| 4,593,640 | A | * | 6/1986 | Blunschi | B63H 21/175 114/123 |
| 5,431,243 | A | * | 7/1995 | Richards | B60G 3/01 180/211 |

(Continued)

OTHER PUBLICATIONS

U.S. Appl. No. 62/917,012 of Kejha filed Nov. 14, 2018.

*Primary Examiner* — John D Walters
*Assistant Examiner* — James J Triggs

(57) ABSTRACT

Safe, three-wheeled tilting scooter or motorcycle frames with two front steerable, non-tilting wheels are described herein, as well as three-wheeled tilting vehicles with various propulsion systems mounted on such frames are also disclosed. Said vehicles are preferably non-polluting, such as electric or fueled by hydrogen.

12 Claims, 7 Drawing Sheets

(51) Int. Cl.
*B62K 11/10* (2006.01)
*B62H 1/02* (2006.01)

(56) References Cited

U.S. PATENT DOCUMENTS

| | | | | |
|---|---|---|---|---|
| 5,762,351 A | * | 6/1998 | Soohoo | B60G 21/007 |
| | | | | 180/210 |
| 7,036,616 B1 | | 5/2006 | Kejha | |
| 7,543,829 B1 | * | 6/2009 | Barnes | B62K 5/02 |
| | | | | 180/210 |
| 7,641,207 B2 | * | 1/2010 | Yang | B62K 5/027 |
| | | | | 180/210 |
| 8,292,315 B1 | * | 10/2012 | Pelkonen | B62K 5/08 |
| | | | | 280/266 |
| 8,322,735 B2 | * | 12/2012 | Steinbach | B62K 3/002 |
| | | | | 280/87.021 |
| 10,131,397 B2 | * | 11/2018 | Page | B62K 5/02 |
| 2011/0006498 A1 | * | 1/2011 | Mercier | B62D 9/02 |
| | | | | 280/124.103 |
| 2019/0055904 A1 | | 2/2019 | Kejha | |

* cited by examiner

SAFE THREE-WHEELED TILTING VEHICLES' FRAME AND STEERING WITH TWO FRONT WHEELS

This Application is continuation in part of prior Provisional Patent of Joseph B. Kejha No. 62/917,012 filed on Nov. 14, 2018, and entitled "Safe Three-Wheeled Tilting Vehicles' Frame and Steering with Two Front Wheels".

BACKGROUND OF THE INVENTION

This invention relates mostly to safe three-wheeled tilting scooters and motorcycles with two front wheels.

DESCRIPTION OF PRIOR ART

It has been recognized, that there is a need for safer and lower cost scooters and motorcycles, which do not slip and fall in turns.

Additionally, it is desired, that such vehicles will be non-polluting, which means to be electric or running on hydrogen, and also having a narrow width.

In prior art, the three-wheel tilting frames were addressed by Honda and Piaggio. Honda's tilting three-wheeler has two rear wheels fixed and driven by an engine via a differential, and the front frame with one steerable front wheel is tilting with a driver, and this frame is attached to the fixed rear frame by a horizontal pivot pin.

This makes the tilting frame possible, but it does not prevent the front wheel slippage in turns, and the differential makes the vehicle more expensive.

Piaggio's tilting three wheel scooter has two front wheels steerable and tilt-able by a parallelogram frame, and one rear driven wheel tilts with the frame and the rider. This construction is safer than Hondas's three-wheeler, but the parallelogram front frame with wheel suspensions is expensive and complex.

Similarly, various motorcycles were designed and built in this manner.

The tilting three-wheelers have an advantage over fixed three-wheelers, that they can be designed to have the same width as two-wheelers, and thus can drive trough a narrow passage. The fixed three-wheelers has to be wide for stability in turns and are driven like a car.

Safe, simpler and lower cost tilting three-wheeler frame with two front steerable wheels of the invention does not suffer from the disadvantages of the prior art.

SUMMARY OF THE INVENTION

It has now been found, that safe, tilting, steerable, three-wheeled scooter or motorcycle frame can be made by having two front steerable, non-tilting wheels attached to a preferably vertically flexible front axle, which axle is attached to a horizontal, longitudinal, fixed base beam with two horizontal, in-line hinges or pins on its upper surface, and on the longitudinal centerline of the vehicle, and having upper vehicle frame keel beam attached to these hinges in such manner, that the upper frame can tilt sideways with the rear driven wheel and the driver. The base beam may be stiffened by optional braces.

The upper frame can be designed to look like a classic scooter (Vespa), (FIG. 1-3) with high seat, or it can be designed as a low drag recumbent motorcycle frame with a low reclined seat like in a car (FIG. 4-6).

In the Vespa style scooter, to be able to steer during the tilt, the handle bar's vertical rod is attached to a universal joint located between the hinges, which joint permits to rotate the vertical rod during the tilt, because its pivot pin is located on the hinges' centerline.

The universal joint's lower end is anchored in a slide fit bushing in the base beam, and its upper end is anchored in a slide bushing in the keel beam, and is connected to a horizontal lever, which lever steers the front wheels' well known steering mechanism via push-pull rods with ball end joints.

The front wheels' flexible axle may be a metal leaf spring or flexible tubing, or a stack of leafs springs from fiberglass. The non-tilting front wheels may also have balloon tires to additionally absorb the shocks from the road, and may have a flat surface for a good grip in turns.

In electric and hybrid electric scooter versions, the battery should be placed in a box under the keel beam, but behind the base beam.

In the recumbent style (FIG. 4-7), the upper frame has the vertical steering rod from the universal joint short, and is connected to additional horizontal push-pull rods via a lever and is activated by a steering wheel, or a yoke handle bar mechanism.

In another embodiment of the invention, the recumbent version of the vehicle steering may have the additional horizontal push-pull rods replaced by dual aircraft type cables and pulleys, connected to the steering yoke's shaft lever, as shown in FIG. 7.

Both types of the upper tilting frames can be locked for parking manually by a well known foldable stand under the vehicles.

The horizontal hinges in the both styles of frames may have optional electric locking clutch(es) attached to at least one of the hinges.

Thus the upper frame in a vertical (non-tilted, standing) position, anytime the vehicle stops, or is slowing down to stop, is locked.

The command "to lock" is initiated by at least one sensor sensing the wheel's motion. Normal clutch's position is "locked" position for parking or standing. When the vehicle starts to accelerate to a certain speed (safe for keeping balance like in two wheelers), the clutch will "unlock" and let the tilting be possible. The clutch may be of disk type preferably with teeth, held in closed position by a compression spring. Unlocking of the clutch may be done by an electric solenoid, powered by the battery via an electronic box.

Both types of the vehicle frames can accommodate various propulsion systems, preferably electric, or hydrogen electric hybrid, as described in my prior patent application Ser. No. 15/731,879, which is hereby incorporated by reference.

Its parts like hydrogen tank, regulator, tubing, control box, and engine with generator on a shelf are shown in FIGS. 1 and 4.

The rear wheel has electric motor built-in, and is suspended by a fork or an arm with a spring. Both vehicles have optional aero-shield in the front, feet rests and rear view mirrors.

The principal object of this invention is to provide safe tilting three wheeled vehicles at lower cost.

Another object of the invention is to provide narrow width three-wheeled vehicles. Another object of the invention is to provide safe, non-polluting commuter vehicles for cities.

Another object of the invention is to provide safe, non-polluting, long range, low drag, fast cruising vehicles for cross country travel.

Other objects and advantages of the invention will be apparent from the description and appended claims.

DESCRIPTION OF THE DRAWINGS

The nature and characteristic features of the invention will be more readily understood from the following description taken in connection with the accompanying drawing forming part thereof, in which.

The same parts have the same numerals in all Figures.

Figure 1:
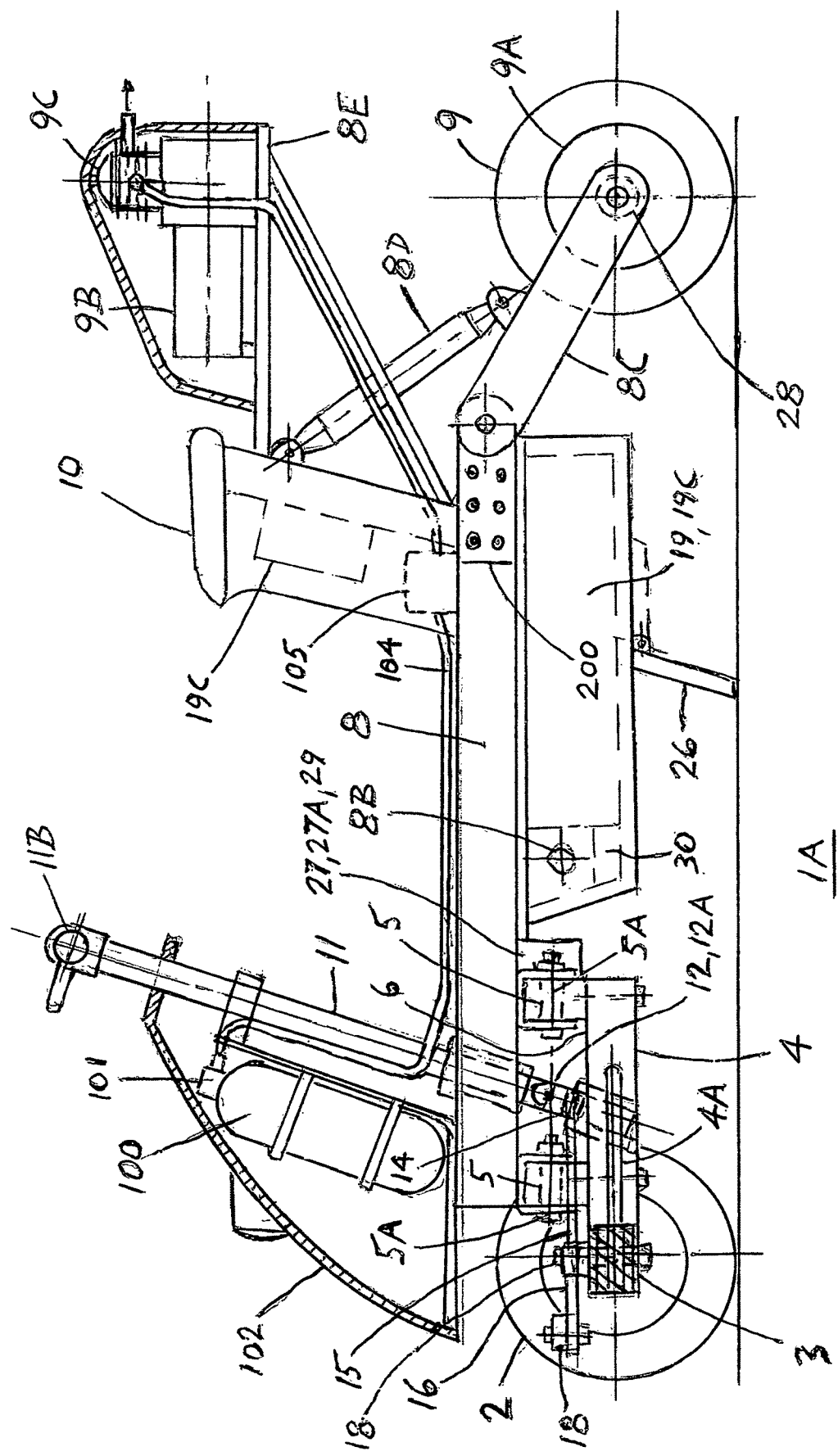
FIG. 1 is a diagrammatic elevational side view of safe, tilting three-wheeled scooter, having hydrogen electric hybrid propulsion system in high seat frame, illustrating its components.
Figure 2:
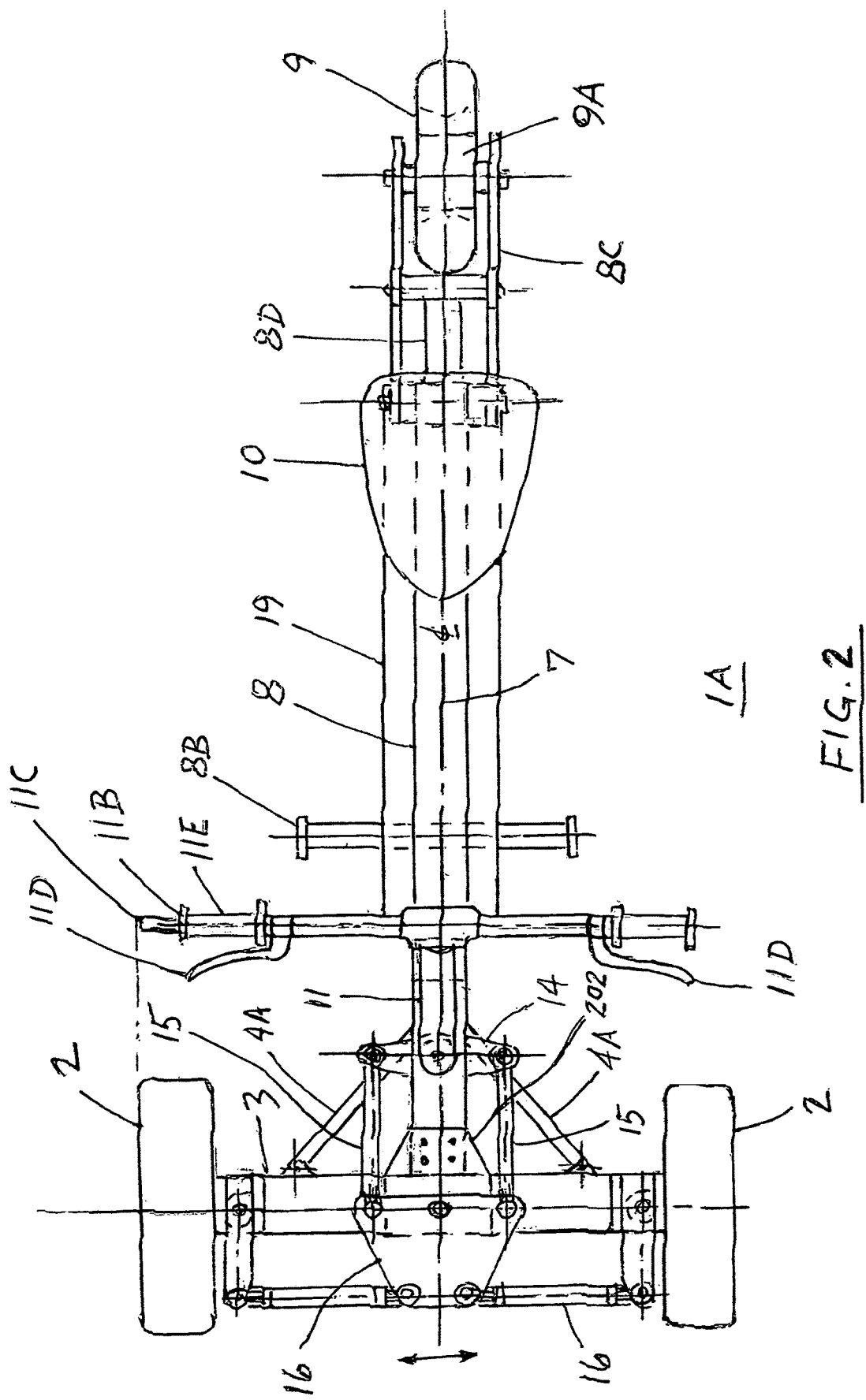
FIG. 2 is a diagrammatic elevational top view of the scooter shown in FIG. 1, Illustrating its components.
Figure 3:
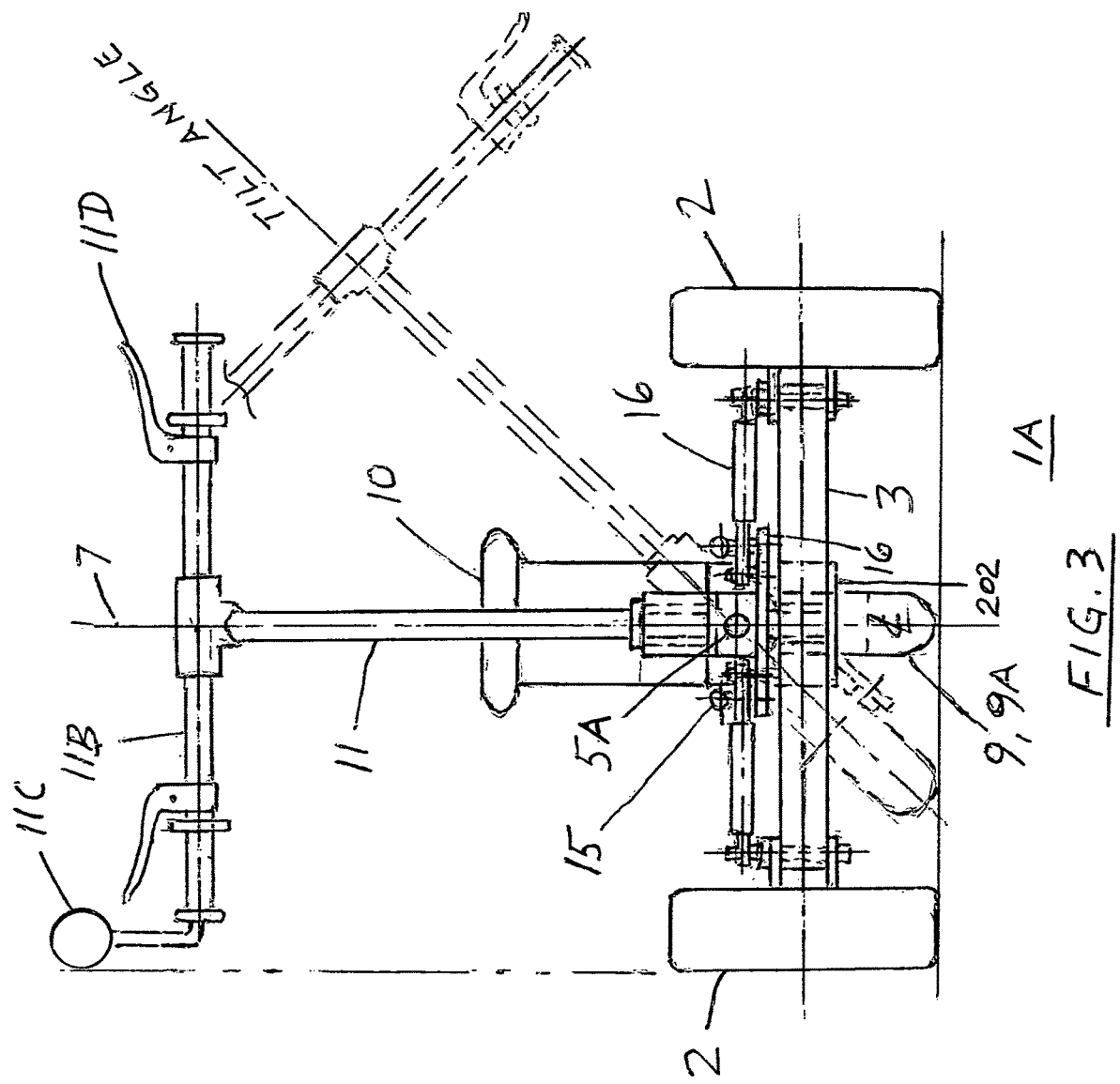
FIG. 3 is a diagrammatic elevational front view of the scooter shown in FIG. 1, illustrating its components.

It should, of course be understood that the description and drawings herein are merely illustrative, and that various modifications, combinations, and changes can be made in the structures disclosed without departing from the spirit of the invention.

DESCRIPTION OF THE PREFERRED EMBODIMENTS

When referring to the preferred embodiments, certain terminology will be utilized for the sake of clarity. Use such terminology is intended to encompass not only the described embodiments, but also technical equivalents, which operate and function in substantially the same way to bring about the same result.

Referring now to FIGS. 1-6, which is one embodiment of the invention, showing tilting, steerable, three-wheeled scooter 1A or motorcycle 1B frame, which can be made by having two front steerable, non-tilting wheels 2 attached to a preferably vertically flexible front axle 3, which axle is attached to a horizontal, longitudinal, fixed base beam 4 with at least two horizontal, in-line hinges or pins 5 on its upper surface 6, and on the longitudinal centerline of symmetry 7 of the vehicle, and having upper vehicle frame longitudinal keel beam 8 or 8A attached to these hinges 5 in such manner, that the upper frame can tilt sideways with the rear driven wheel 9 and the driver. The base beam 4 may be stiffened by braces 4A.

Figure 4:
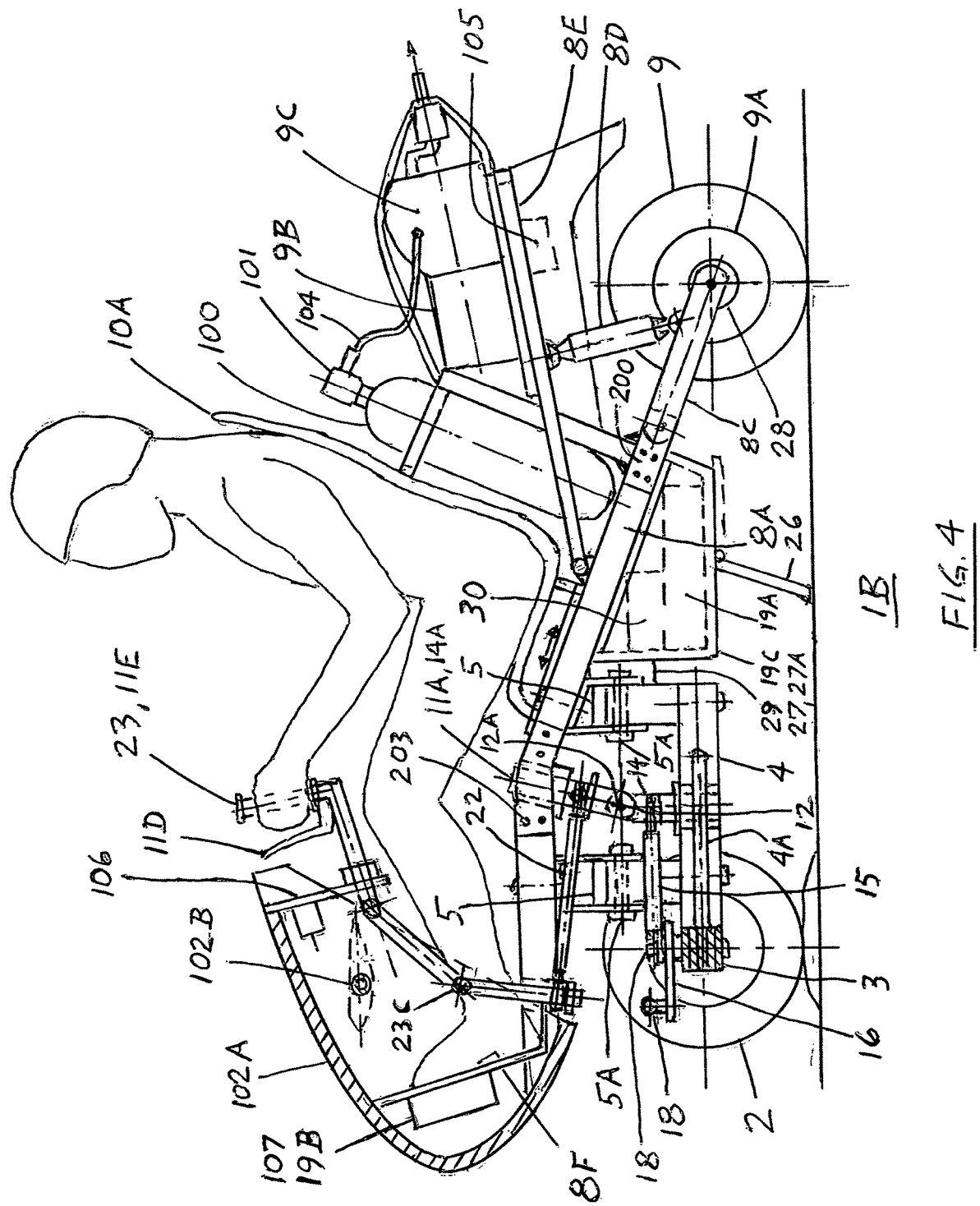
FIG. 4 is a diagrammatic elevational side view of safe, tilting three-wheeled motorcycle, having hydrogen electric hybrid propulsion system in recumbent style seat frame, illustrating its components.
Figure 5:
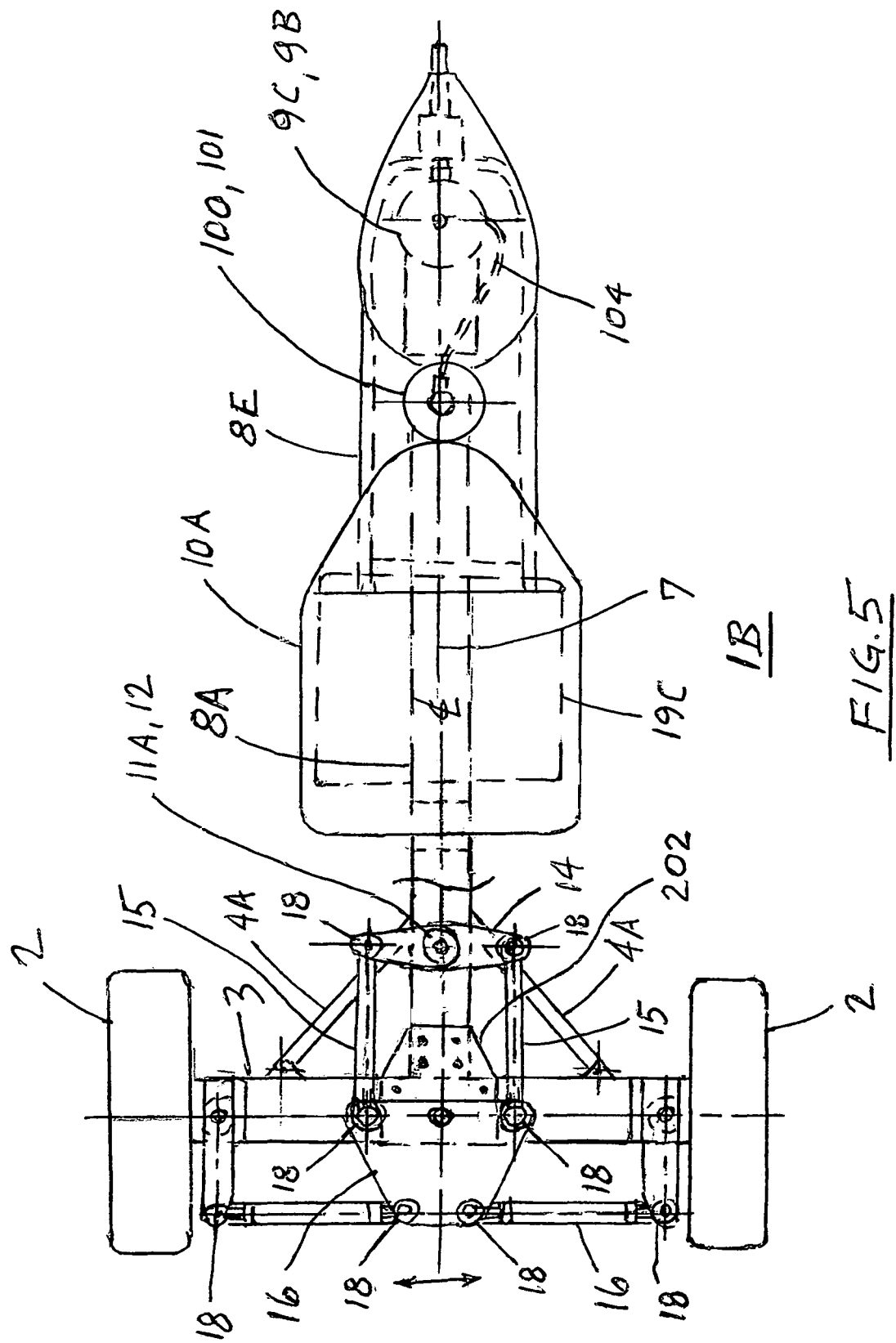
FIG. 5 is a diagrammatic elevational top view of the motorcycle shown in FIG. 4, illustrating its components.
Figure 6:
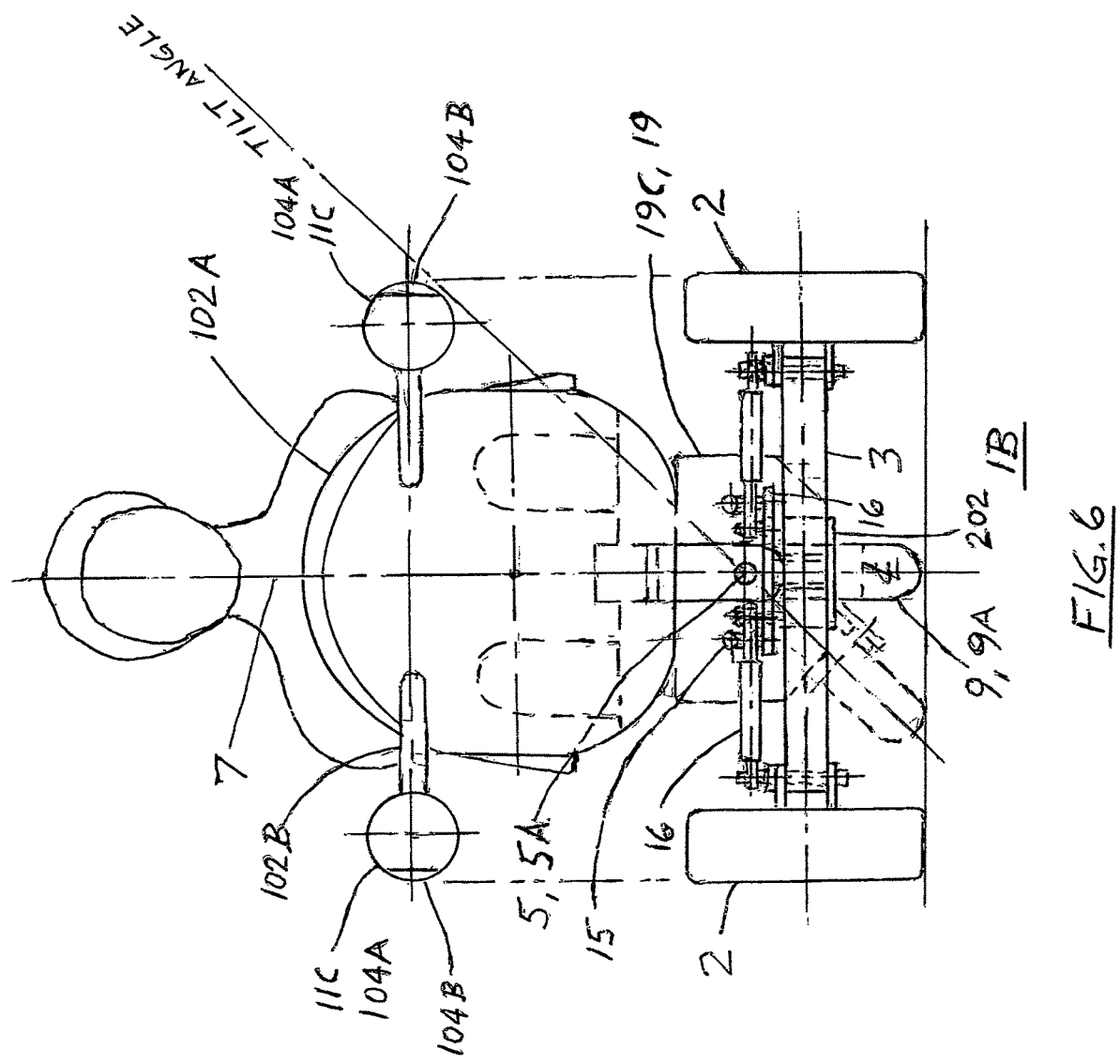
FIG. 6 is a diagrammatic elevational front view of the motorcycle shown in FIG. 4, illustrating its components.

The upper frame can be designed to look like a classic scooter (Vespa)1A, (FIG. 1-3) with high seat 10, or it can be designed as a low drag recumbent motorcycle 1B frame with a low reclined seat 10A like in a car (FIG. 4-6).

In the Vespa style scooter, to be able to steer during the tilt, the handle bar's 11B vertical rod 11 is attached to a universal joint 12 located between the hinges 5, which joint permits to rotate the vertical rod 11 during the tilt, because its pivot pin 12A is located on the hinges' 5 centerline 5A.

The universal joint's 12 lower end is anchored in a slide fit bushing in the base beam 4, and its upper end is anchored in a slide bushing in the keel beam 8 or 8A, and is connected to horizontal lever 14, which lever steers the front wheels' well known steering mechanism 16 via push-pull rods 15 with ball end joints 18.

The front wheels' flexible axle 3 may be a metal leaf spring or a flexible tubing, or a stack of leaf springs from fiberglass. The non-tilting front wheels 2 may have balloon tires to additionally absorb shocks from the road, and may have a flat surface for a good grip in turns.

In electric and hybrid electric scooter versions, the battery 19 should be placed in a box 19C under the frame keel 8, or 8A, but behind the base beam 4.

In the recumbent style (FIG. 4-7), the upper frame has the vertical steering rod 11A from the universal joint 12 short, and is connected to the horizontal push-pull rods 22, via lever 14A, and the rods 22 are activated by a steering wheel (not shown), or yoke handle bar mechanism 23 via shafts with two universal joints 23C.

Figure 7:
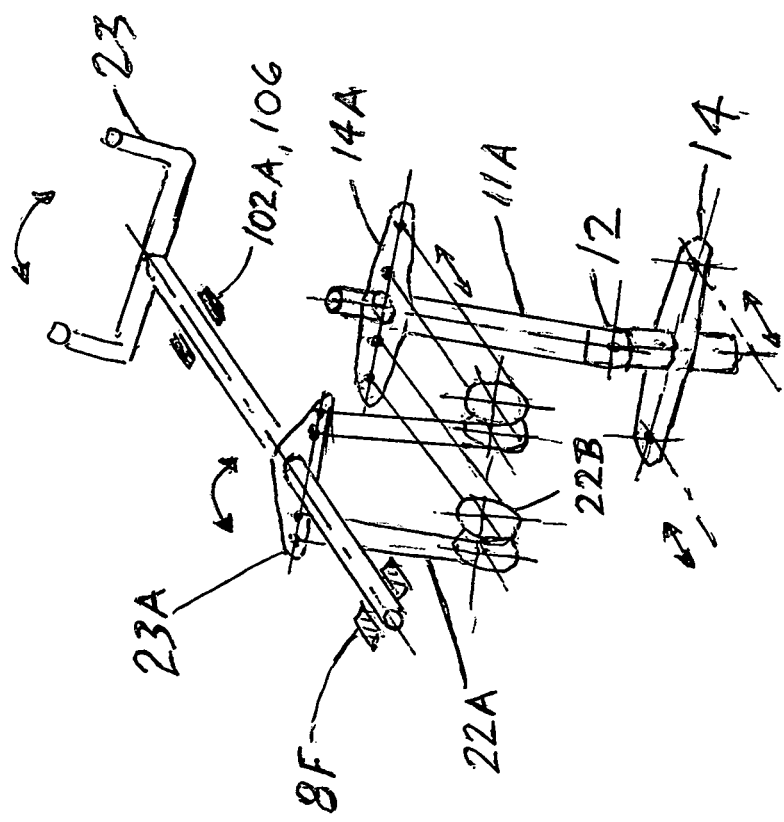
FIG. 7 is an axonometric view of optional steering of the recumbent motorcycle by cables.

In another embodiment of the invention, the recumbent version of the vehicle steering may have the horizontal push-pull rods 22 replaced by dual aircraft type. cables 22A and pulleys 22B, connected to the steering yoke's 23 shaft lever 23A, as shown in FIG. 7.

Both types of the upper tilting frames can be locked for parking manually by a well known foldable stand 26 under the vehicles.

The horizontal hinges in the both styles of frames may have optional electric locking clutch(es) 27 attached to at least one of the hinges 5.

Thus the upper frame in a vertical (non-tilted, standing) position, anytime the vehicle stops, or is slowing down to stop, is locked.

The command "to lock" is initiated by at least one sensor 28 sensing the wheel's 9 motion. Normal clutch's position is "locked" position for parking or standing. When the vehicle starts to accelerate to a certain speed (safe for keeping balance like in two wheelers), the clutch 27 will "unlock" and let the tilting be possible.

The clutch 27 may be of disk type, preferably with teeth, and is held in closed position by a compression spring 27A. Unlocking of the clutch may be done by an electric solenoid 29, powered by the battery 19 via electronic box 30.

Both types of the vehicle frames can accommodate various propulsion systems, preferably electric, or hydrogen electric hybrid, as described in my prior patent application Ser. No. 15/731,879, which is hereby incorporated by reference.

Its parts like hydrogen tank 100, pressure regulator 101, tubing 104, control box 105, engine 9C with generator 9B on shelf 8E are shown in FIGS. 1 and 4.

The rear wheel 9 has electric motor 9A built-in, and is suspended by arm 8C with spring 8D. Both vehicles have optional aero-shield 102 or 102A in the front, and feet rests 8F or 8B.

The scooter style vehicle 1A has rear and front wheels' brake levers 11D mounted on the handle bar 11B with wrist handle 11E for motor 9A RPM control.

The recumbent style motorcycle vehicle 1B has on the aero-shield 102A mounted a "canard wing" 102B with two rear view mirrors 11C with lights 104A. The lights 104A have aerodynamic nose clear lenses with blinkers 104B.

Electronic controls 19B of the motor 9A and the battery 19A may be placed in electric box 107 in the aero-shield 102A.

Similarly, as in the scooter vehicle 1A the brake levers 11D and the wrist handle 11E for the RPM control of the motor 9A are mounted on the vehicle 1B handle bar yoke 23. Control panel 106 may be also mounted in the aero-shield 102A.

Advantage of the recumbent style vehicle 1B is in very small turning radius, due to the relatively close distance between the front wheels 2 and the rear wheel 9, which makes this vehicle very maneuverable. It also has a lower air drag than a classic motorcycles or scooters, due to the smaller frontal area, and thus can have a longer range on the same amount of fuel or electricity stored.

In case of battery electric only propulsion, or liquid fuel IC (internal combustion) electric hybrid propulsion, all the hydrogen related components are omitted from both types of vehicles.

In case of IC liquid fuel only, and IC hydrogen only propulsion systems, the IC engine with a clutch may be mounted on the pivoting arm 8C, and drives the rear wheel 9 (without the motor 9A) by a chain or timing belt (not shown). In a parallel hybrid, the wheel 9 has the motor 9A built in, and has the IC engine on the fork 8C, also driving the wheel 9.

In case of fuel cell system propulsion, the generator 9B with IC engine 9C on the shelf 8E is replaced by a fuel cells stack (not shown).

It should be noted that the above propulsion systems are described as an example only, and that the three-wheeled vehicles of the invention can use many various propulsion systems, and are not to be bound only to the described systems. Described three-wheeled tilting frames of the invention may be constructed from conventional materials, like welded steel or aluminum tubing, or preferably may have some parts like the base beam 4 and keel beam 8 or 8A made from aluminum or magnesium square or rectangular tubing, joined to the cross axle 3 and swing arm 8C by fittings with adhesive, additionally locked by spring-roll pins, as described in my prior U.S. Pat. No. 7,036,616 (FIG. 16), which is hereby incorporated by reference.

Another construction of the frames of the invention may be by using square or rectangular aluminum tubing, or laminated wood for the base beam 4 and keel beam 8 or 8A, which may be joined to other components by aluminum or other metal plates 200, 202 and 203 with bolts and adhesive.

It will thus been seen, that safe tilting three-wheeled vehicles with preferably non-polluting propulsion are herein described, with which the objects of the invention are achieved.

I claim:

1. A three-wheeled tilting frame with two front steerable, non-tilting wheels for scooters and motorcycles, having longitudinal center-line of symmetry, and which frame comprising:
   a front cross axle with two steerable, non-tilting wheels;
   a longitudinal, horizontal base beam attached to said axle on said center-line of symmetry, and said base beam having upper surface, on which surface said base beam has mounted at least two horizontal, longitudinally in-line hinges, on said longitudinal center-line of symmetry of said frame;
   a longitudinal keel beam attached to said hinges on top of said base beam, and said keel beam is tilt-able sideways;
   a front aero shield, a seat, and a rear wheel attached to said keel beam, and tilt-able together with said keel beam;
   a steering mechanism having a handle bar and a vertical steering rod with a universal joint with a pivot pin, said universal joint is attached to said base beam and to said keel beam by slide fit bushings, and said universal joint having its pivot pin's center on said hinges horizontal center-line,
   and having said vertical steering rod connected to said handle bar and to said front wheels via shafts, push-pull rods and levers, thus providing steering during tilting and during straight ride.

2. The three-wheeled tilting frame with two steerable non-tilting front wheels for scooters and motorcycles as described in claim 1,
   in which said steering mechanism's two push pull rods are replaced with aircraft type cables and pulleys.

3. The three-wheeled tilting frame with two steerable non-tilting front wheels for scooters and motorcycles as described in claim 1,
   in which said front cross axle is vertically flexible and said rear wheel is suspended on a swinging arm with a spring.

4. The three-wheeled tilting frame with two steerable, non-tilting front wheels for scooters and motorcycles as described in claim 1,
   which frame has a propulsion system, and said propulsion system's battery is mounted under said keel beam.

5. The three-wheeled tilting frame with two steerable, non-tilting front wheels for scooters and motorcycles as described in claim 1,
   which has an electric motor in said rear wheel.

6. The three-wheeled tilting frame with two steerable, non-tilting front wheels for scooters and motorcycles as described in claim 4,
   in which said propulsion system is a hydrogen fueled electric hybrid.

7. The three-wheeled tilting frame with two steerable, non-tilting front wheels for scooters and motorcycles as described in claim 4,
   in which said propulsion system is a liquid fuel fueled electric hybrid.

8. The three-wheeled tilting frame with two steerable, non-tilting front wheels for scooters and motorcycles as described in claim 1,
   which frame has an internal combustion engine propulsion system mounted on.

9. The three-wheeled tilting frame with two steerable, non-tilting front wheels for scooters and motorcycles as described in claim 3,
   in which said base beam and said keel beam are made of aluminum tubing, adhesively joined to said cross axle and said swing arm by fittings, additionally locked by spring-roll pins.

10. The three-wheeled tilting frame with two steerable, non-tilting front wheels for scooters and motorcycles as described in claim 3,
    in which said base beam and said keel beam are made from laminated wood, joined to said cross axle and to said swing arm by aluminum plates with bolts and adhesive.

11. The three-wheeled tilting frame with two steerable, non-tilting front wheels for scooters and motorcycles as described in claim 1,
    in which said front aero-shield has mounted on a canard wing, supporting two rear view mirrors.

12. The three-wheeled tilting frame with two steerable, non-tilting front wheels for scooters and motorcycles as described in claim 1, in which at least one of said horizontal hinges has an electric locking clutch attached and controlled by a wheel speed sensor via an electronic control box.

* * * * *